United States Patent
Pilzweger

(10) Patent No.: US 11,103,953 B2
(45) Date of Patent: Aug. 31, 2021

(54) DEVICE FOR ADDITIVE PRODUCTION OF THREE-DIMENSIONAL OBJECTS

(71) Applicant: CL SCHUTZRECHTSVERWALTUNGS GMBH, Lichtenfels (DE)

(72) Inventor: Florian Pilzweger, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 458 days.

(21) Appl. No.: 15/902,984

(22) Filed: Feb. 22, 2018

(65) Prior Publication Data
US 2018/0250769 A1 Sep. 6, 2018

(30) Foreign Application Priority Data
Mar. 2, 2017 (DE) .......................... 102017104351.9

(51) Int. Cl.
*B23K 26/142* (2014.01)
*B29C 64/268* (2017.01)
(Continued)

(52) U.S. Cl.
CPC .......... *B23K 26/142* (2015.10); *B23K 26/123* (2013.01); *B23K 26/144* (2015.10);
(Continued)

(58) Field of Classification Search
CPC ................ B23K 26/142; B23K 26/127; B23K 26/1438; B23K 26/144; B23K 26/1462; B23K 26/123; B23K 26/125
See application file for complete search history.

(56) References Cited

U.S. PATENT DOCUMENTS

| 4,537,629 A | 8/1985 | Lazcano-Navarro et al. |
| 5,359,176 A | 10/1994 | Balliet, Jr. et al. |

(Continued)

FOREIGN PATENT DOCUMENTS

| DE | 102006052292 A1 | 5/2008 |
| EP | 3147047 A1 | 3/2017 |

(Continued)

OTHER PUBLICATIONS

Machine Translated Japanese Search Report Corresponding to Application No. 2016148489 dated Dec. 9, 2019.
(Continued)

*Primary Examiner* — J C Jacyna
(74) *Attorney, Agent, or Firm* — Dority & Manning, P.A.

(57) ABSTRACT

The invention relates to a device (1) for the additive production of three-dimensional objects (2) by successive, layered, selective exposure and accompanying successive, layered, selective solidification of construction material layers of a construction material (3) that can be solidified by means of an energy beam (4), comprising a flow device (11), which is designed to form a first fluid flow (FS1) that flows, particularly in a circuit-like manner, along at least one functional component of the device (1), wherein the first fluid flow (FS1) is laden with contaminants, particularly particulate contaminants, which are process-created, wherein the flow device (11) is designed to form a second fluid flow (FS2), wherein the second fluid flow (FS2) flows between the first fluid flow (FS1) and the at least one functional component of the device (1), directly along the surface of the at least one functional component of the device (1).

13 Claims, 3 Drawing Sheets

(51) Int. Cl.
   *B23K 26/14*   (2014.01)
   *B23K 26/144*  (2014.01)
   *B29C 64/153*  (2017.01)
   *B23K 26/12*   (2014.01)
   *B22F 10/00*   (2021.01)
   *B33Y 10/00*   (2015.01)
   *B33Y 30/00*   (2015.01)
   *B33Y 40/00*   (2020.01)
   *B29C 64/371*  (2017.01)

(52) U.S. Cl.
   CPC ...... *B23K 26/1438* (2015.10); *B23K 26/1462* (2015.10); *B29C 64/153* (2017.08); *B29C 64/268* (2017.08); *B22F 10/00* (2021.01); *B29C 64/371* (2017.08); *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 6,583,379 B1 | 6/2003 | Meiners et al. | |
| 2001/0040149 A1* | 11/2001 | Otsubo | B23K 26/382 219/121.7 |
| 2002/0023907 A1* | 2/2002 | Morishige | B23K 26/1462 219/121.85 |
| 2011/0291331 A1* | 12/2011 | Scott | B33Y 30/00 264/510 |
| 2012/0251378 A1 | 10/2012 | Abe et al. | |
| 2015/0004895 A1* | 1/2015 | Hammers | B08B 15/002 454/49 |
| 2016/0121398 A1* | 5/2016 | Schlick | B28B 1/001 425/11 |
| 2017/0087635 A1* | 3/2017 | Wilkes | B23K 26/142 |
| 2017/0165751 A1* | 6/2017 | Buller | B29C 64/40 |
| 2018/0200833 A1* | 7/2018 | Izumi | B23K 26/21 |
| 2020/0276762 A1* | 9/2020 | Yamamoto | B33Y 40/20 |

FOREIGN PATENT DOCUMENTS

| | | | |
|---|---|---|---|
| JP | S63157809 | A | 6/1988 |
| JP | H01222009 | A | 9/1989 |
| JP | HO1222009 | A | 9/1989 |
| JP | H0959708 | A | 3/1997 |
| JP | H10147808 | A | 6/1998 |
| JP | 2007/177295 | A | 7/2007 |
| WO | 2016102970 | A1 | 6/2016 |

OTHER PUBLICATIONS

European Search Report Corresponding to Application No. 17180089 dated Feb. 6, 2018.

Machine Translated Japanese Search Report Corresponding to Application No. 2016148789 dated Dec. 9, 2019.

Machine Translated Japanese Office Action Corresponding to Application No. 2016148489 dated Dec. 24, 2019.

* cited by examiner

DEVICE FOR ADDITIVE PRODUCTION OF THREE-DIMENSIONAL OBJECTS

CROSS-REFERENCE TO RELATED APPLICATIONS

This application claims priority to German Patent Application serial no. 10 2017 104 351.9 filed Mar. 2, 2017, the contents of which are incorporated herein by reference in their entirety as if set forth verbatim.

DESCRIPTION

Background

The present invention relates to a device for the additive production of three-dimensional objects having a flow device, which is designed to form a first fluid flow and a second fluid flow.

BRIEF SUMMARY OF THE DISCLOSURE

The invention relates to a device for the additive production of three-dimensional objects by successive, layered, selective exposure and accompanying successive, layered, selective solidification of construction material layers of a construction material that can be solidified by means of an energy beam, comprising a flow device, which is designed to form a first fluid flow, which flows along at least one functional component of the device at least in sections and which can be laden or is laden with contaminants, particularly particulate contaminants, which are process-created.

Devices for additive production of three-dimensional objects are generally known. It is also known that corresponding devices comprise a flow device which is designed to form a fluid flow that flows, particularly in a circuit-like manner, along at least one functional component of the devices. The fluid flow serves particularly to remove contaminants, particularly particulate contaminants—typically so-called fume or smoke particulates—from a process chamber of the devices. The fluid flow formed by the flow device is laden with process-created contaminants along the flow path thereof and contains, particularly after exiting the process chamber, corresponding process-created contaminants.

The fluid flow laden with corresponding contaminants typically flows along certain functional components of the devices. Studies have shown that deposits can form on the functional components due to the fluid flow laden with corresponding contaminants that flows alongside said components, which can negatively influence the functionality thereof. For example, the flow cross-section of flow-conducting functional components, such as tubular flow control elements, for example, can be reduced by corresponding deposits and can thus negatively influence the flow properties.

The problem to be solved by the invention is that of specifying an improved device for additive production of three-dimensional objects, particularly in respect of the prevention or reduction of corresponding deposits on functional components.

This problem is solved by a device for additive production of three-dimensional objects according to the claims. The claims dependent on said claim relate to possible embodiments of the device.

The device described herein ("device") is designed for the additive production of objects, that is, for example, technical components or technical component groups, by successive, layered, selective exposure and accompanying successive, layered, selective solidification of construction material layers of a construction material that can be solidified in the regions corresponding to the layer-based cross-section of the object to be produced. The construction material can be a particulate or powdery metal, plastic and/or ceramic material. The selective solidification of construction respective material layers to be solidified occurs on the basis of object-based construction data. Corresponding construction data describe the geometric design of the respective object to be additively produced and can, for example, include "sliced" CAD data of the object to be additively produced. The device can be designed as an SLM device, for example, that is, as a device for carrying out selective laser melting processes (SLM process), or as an SLS device, that is, as a device for carrying out selective laser sintering processes (SLS process). It is also conceivable that the device can be designed as an SEBS device; that is, as a device for carrying out selective electron beam melting processes (SEBS process).

The device comprises the functional components typically required for carrying out additive construction processes. These particularly include a coating device and an exposure device. The coating device is designed to form selectively exposed or selectively solidified construction material layers in a construction plane of the device, in which the successively layered selective exposure and the associated successively layered selective solidification of construction material layers of the construction material that can be solidified by an energy beam take place, and typically comprises a coating element, which is particularly blade-like or blade-shaped, and is movably borne relative to the construction plane. The exposure device is designed for the selective exposure of construction material layers to be selectively exposed in the construction plane of the device and typically comprises a radiation generation device, which is designed to produce an energy beam, and a beam deflection device, as applicable, which is designed to deflect the energy beam to respective regions of respective construction material layers to be selectively exposed or solidified.

The device furthermore comprises a flow device, which is designed to form a first fluid flow, typically a first gas flow, which flows along at least one functional component of the device, and which can be laden or is laden with contaminants, particularly particulate contaminants, which are process-created. A flowing of the fluid flow along a functional component of the device is understood to mean, as shown in the following, that the fluid flow flows at least in sections along an outside and/or inside surface of a respective functional component. In order to form the fluid flow, the flow device typically comprises a flow generation device; that is, a blowing or suction device, for example. The flow generation device is designed to form a fluid flow having certain flow properties; that is, a certain flow speed and a certain flow profile, for example. As shown in the following, a corresponding functional component of the device can particularly be a tubular or tube-shaped flow control element. A corresponding flow control element can be a component of a flow control structure defining a flow path of the fluid flow through which the fluid flow can flow or flows.

The fluid flow serves particularly to remove contaminants, particularly particulate contaminants ("contaminants")—typically so-called fume or smoke particulates—from a process chamber of the device. The mentioned flow control structure is typically connected on one side to a flow input of the process chamber of the device and on the other side to a flow output of the process chamber of the device, so that the fluid flow flows through the process chamber, wherein it is laden with corresponding contaminants. It thus generally applies that the first fluid flow formed by the flow device is laden with process-created contaminants along the flow path thereof and contains, particularly after exiting the process chamber, corresponding process-created contaminants.

In order to confront the problem described above, according to which deposits can form on the functional components due to the first fluid flow laden with corresponding contaminants flowing along said components, which can negatively influence the functionality thereof, the flow device is additionally designed to form a second fluid flow; that is, typically a gas flow. According to the invention, the flow device is designed to form the second fluid flow so that it flows between the first fluid flow and the at least one functional component of the device, at least in sections, directly along the surface of the at least one functional component of the device. The flow device is consequently designed to form a corresponding flow control of a first and second fluid flow at least in sections along respective functional components of the device. Of course, corresponding functional components can be additionally provided at least in sections with a surface finish preventing the formation of corresponding deposits.

Due to the selective "interposition" of a second fluid flow containing no, or (significantly) fewer process-created contaminants in comparison to the first fluid flow between the first fluid flow containing process-created contaminants and the surface of the respective functional component, the possibility of a depositing of corresponding contaminants on the respective functional component is inhibited or reduced. The second fluid flow can be designated or considered as a "protection flow" or "shielding flow," since it protects the respective functional component from deposits of contaminants contained in the first fluid flow or shields the respective functional component from deposits of contaminants contained in the first fluid flow. The second fluid flow can thus also be considered to be a "carpet" or "curtain" associated with a respective functional component, which ensures a corresponding protection or shielding effect.

Two different fluid flows consequently flow through the indicated flow control structure, at least in sections, wherein the first fluid flow contains corresponding contaminants and the second fluid flow contains no or fewer contaminants by comparison. Because the second fluid flow flows directly along the surface of a respective functional component, as stated, the possibility of deposits on the respective functional component is thereby prevented or reduced. In order to prevent or to reduce a depositing of contaminants in the second fluid flow, the second fluid flow can be controlled in respect of flow technology such that it does not flow through the process chamber, that is, the location in which corresponding contaminants (substantially) occur; the second fluid flow can therefore be combined with the first fluid flow only after the process chamber. It is also possible, however, that the second fluid flow also flows through the process chamber, at least in sections. The second fluid flow can thus flow only along certain sections of the process chamber, particularly those sections of the process chamber in which corresponding deposits (would) typically form. A corresponding flow in sections of the second fluid flow can be achieved by a selective inflow or influx of the second fluid flow in the region of the respective sections of the process chamber. The preceding comments naturally apply analogously for all functional components addressed herein.

In connection with the first fluid flow, it was mentioned that said first fluid flow can flow at least in sections along an outside and/or inside surface of a respective functional component. The same applies, as mentioned, for the second fluid flow. The flow device can thus be designed to form a first and a second fluid flow, which—providing that the second fluid flow flows at least in sections directly along the surface of the respective functional component—each flow along an outside surface, particularly an exposed outside surface of the at least one functional component of the device and/or along an inside surface of the at least one functional component of the device, or an additional component of the device. The general result of this is that a respective functional component can have at least one outside surface and, as applicable, at least one inside surface. The typical outside surface of the respective functional component (substantially) defining the outer geometric appearance of the respective functional component comprises at least one outside surface section, along which the first and second fluid flow flows or can flow. The inside surface, insofar as it is present, of the respective functional component comprises at least one inside surface section, along which the first and second fluid flow can flow. The inside surface of the respective functional component can delimit an interior chamber through which the first and second fluid flow can flow or flows, at least in sections.

The properties, that is, the chemical and/or physical properties, for example, and the fluidic properties of the first and/or second fluid flow can be chosen in dependence on the chemical and/or physical properties of the possible deposits, that is, particularly in dependence on the chemical and/or physical properties of the contaminants contained in the first fluid flow. For example, the depositing of contaminants having first chemical and/or physical properties can be prevented by certain first flow properties of the second fluid flow, while the depositing of contaminants having second chemical and/or physical properties can be prevented by certain second flow properties of the second fluid flow.

A respective functional component can have, at least in sections, particularly in full, a flat geometric design or, at least in sections, particularly in full, a cylindrical or cylinder-shaped geometric design or, at least in sections, particularly in full, a hollow cylindrical or hollow cylinder-shaped geometric design.

Specifically, a corresponding functional component of the device can be, for example, a particularly tubular or tube-shaped flow control element, which comprises a flow interior chamber and is also designated as a flow tube, wherein the first and second fluid flow can flow through the flow interior chamber, at least in sections, or an optical element comprising a flow surface, that is, an optical lens or a protective glass of a protective glass device, via which an energy beam can be introduced into the process chamber, of an optical device, for example, wherein the first and second fluid flow can flow over the flow surface, or a process chamber wall delimiting the process chamber of the device, wherein the first and second fluid flow can flow over the process chamber wall, at least in sections. A functional component of the device can generally also be a peripheral device that can be allocated or is allocated to the device, such as a filter device, a construction material storage device, an unpacking device, etc. In general, the invention addresses every functional component on which corresponding deposits can form.

The first fluid flow and the second fluid flow can differ in at least one flow parameter related to the flow properties of the respective fluid flow, particularly the flow speed. The possibility of mixing the first and second fluid flow can be reduced by the different flow parameters. Ideally, the first and second fluid flows flow parallel in respect of the flow direction thereof and intermix as little as possible. As such, the described protection or shielding effect of the second fluid flow is particularly reliable.

The first fluid flow can flow in a (substantially) linear manner, for example; the second fluid flow can flow enclosing around the first fluid flow in sections, particularly in full. In particular, the second fluid flow can flow in a helical or helix-shaped ("helical") manner—this can also be understood to be a second fluid flow flowing in a spiral-like or spiral-shaped manner; the first fluid flow can therefore flow enclosing around a second fluid flow flowing in a helical manner, at least in sections. The flow direction of the first and second fluid flow is typically the same in all cases. A second fluid flow flowing in a helical manner can be implemented by a suitable, that is, particularly an angularly inclined arrangement of nozzle elements, for example. For the example of a functional component having a hollow cylindrical geometrical design, such as a tube-like flow control element, the first fluid flow can flow centrally through the functional component, for example, while the second fluid flow flows, at least in sections, enclosing the first fluid flow, between the first fluid flow and the surface of the functional component defined by the inner circumference thereof.

The first fluid flow and the second fluid flow can also differ in at least one physical parameter related to the physical properties of the respective fluid flow, particularly the density. The possibility of mixing the first and second fluid flow can also be reduced by the different physical parameters. As mentioned, the first and second fluid flows ideally flow parallel in respect of the flow direction thereof and intermix as little as possible. As such, the described protection or shielding effect of the second fluid flow is particularly reliable. For the example of a flat surface of a functional component, the second fluid flow can have a higher density than the first fluid flow, for example, for which reason the second fluid flow preferably flows directly along the surface of the respective functional component.

The flow device can be part of a nozzle device comprising a plurality of nozzle elements. At least one first nozzle element or at least one group of first nozzle elements can be designed to form the first fluid flow, and at least one second nozzle element or at least one group of second nozzle elements is designed to form the second fluid flow. By arranging and aligning the respective nozzle elements or nozzle element groups, which can self-evidently also differ in the respective nozzle (cross-section) geometries thereof, two parallel flowing fluid flows can be selectively generated. The arrangement, alignment and nozzle (cross-section) geometries of respective nozzle elements can be selected in dependence on the chemical and/or physical properties of the contaminants contained in the first fluid flow. Different flows of the first and second fluid flow, as mentioned, particularly a helically flowing second fluid flow, can be formed by a suitable, that is, particularly angularly inclined arrangement of the respective nozzle elements or nozzle element groups.

As mentioned, the flow device can be designed to form a fluid flow flowing along at least one functional component of the device in a circuit-like manner. According to the invention, respective first and second nozzle elements or respective first and second nozzle element groups can be arranged or designed on the same or different sections of the flow circuit formed by the fluid flow that flows in a circuit-like manner. For the example of a process chamber as a corresponding functional component, the nozzle elements or nozzle element groups forming the second fluid flow can be arranged at least in sections in the process chamber. As such, it is possible that the second fluid flow is joined together with the first fluid flow in the process chamber. The nozzle elements or nozzle element groups forming the second fluid flow can also be alternatively arranged in front of or after the process chamber. As such, it is possible that the second fluid flow is joined together with the first fluid flow before or after the process chamber.

The first and the second fluid flow are each typically inert. Consequently, the first and the second fluid flow can each by formed by an inert flow fluid or gas. A corresponding flow fluid can be argon, carbon dioxide or nitrogen, for example.

The invention furthermore relates to a method for operating a device for the additive production of three-dimensional objects by successive, layered, selective exposure and accompanying successive, layered, selective solidification of construction material layers of a construction material that can be solidified by means of an energy beam, wherein a first fluid flow, which is formed by a flow device, flows along at least one functional component of the device, particularly in a circuit-like manner, wherein the first fluid flow is laden with contaminants, particularly particulate contaminants, which are process-created. The method is characterized in that a second fluid flow is formed by the flow device, wherein the second fluid flow flows between the first fluid flow and the at least one functional component of the device, directly along the surface of the at least one functional component of the device. All comments in connection with the device apply analogously for said method.

Furthermore, the invention relates to a method for protecting a functional component, particularly a functional component of a device as described, from contaminants, particularly particulate contaminants, adhering thereto, particularly in the region of a surface, wherein a first fluid flow flows along the functional component, particularly in a circuit-like manner, wherein the first fluid flow is laden with contaminants, particularly particulate contaminants. The method is characterized in that a second fluid flow is additionally formed, wherein the second fluid flow flows between the first fluid flow and the at least one functional component of the device, directly along the surface of the at least one functional component. All comments in connection with the device apply analogously for said method.

BRIEF DESCRIPTION OF THE DRAWINGS

The invention is explained in more detail based on embodiments in the figures. They show.

DETAILED DESCRIPTION

Figure 1:
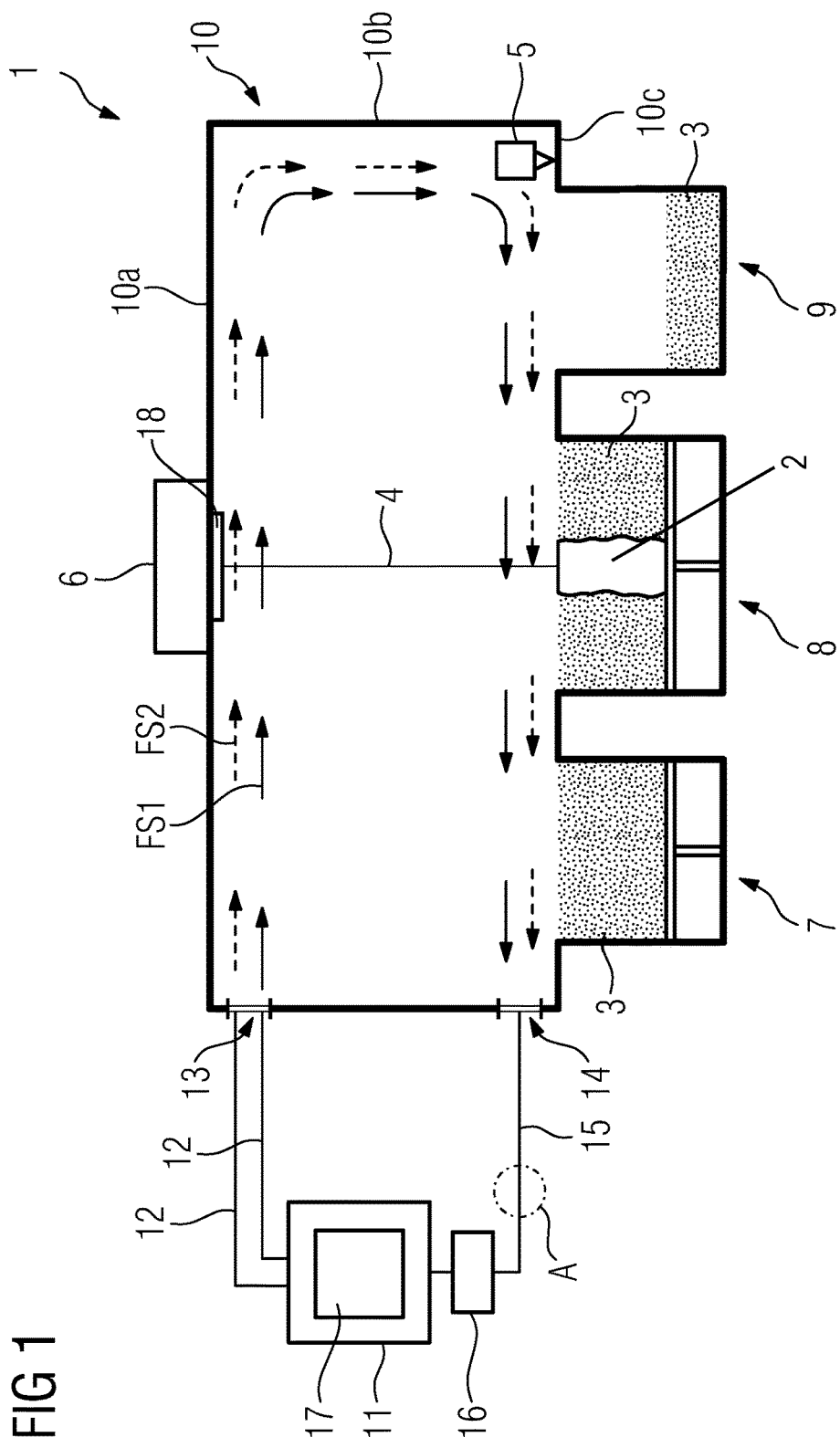
FIGS. 1 and 2 each provide a schematic diagram of a device according to an embodiment.
Figure 2:
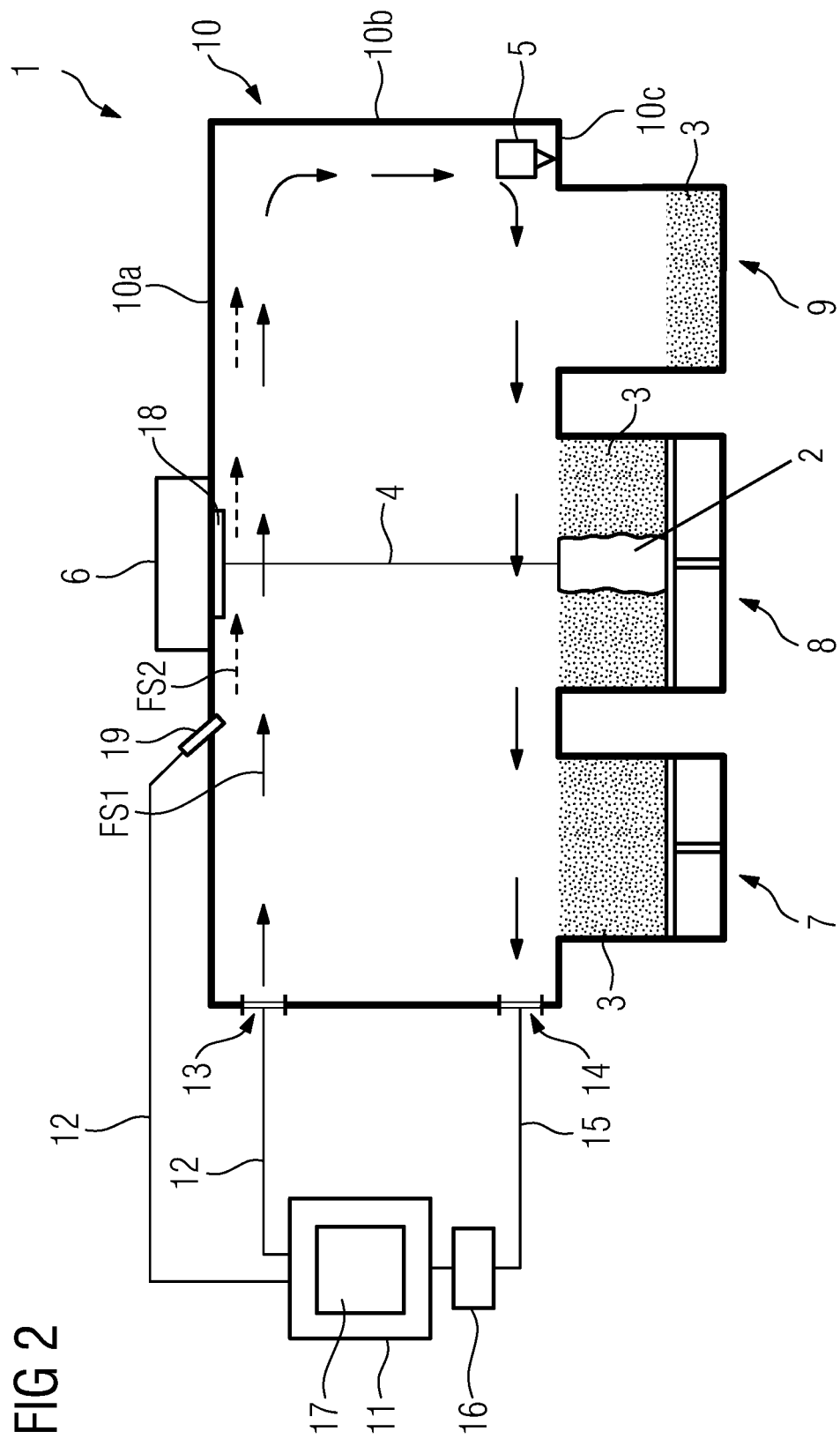

FIG. 1—the same applies for FIG. 2—shows a schematic diagram of a device 1 according to an embodiment. The device 1 serves for the additive production of three-dimensional objects 2, that is, for example, particularly technical components or technical component groups, by successive, layered, selective exposure and accompanying successive, layered, selective solidification of construction material layers of a construction material 3, that is, a metal powder, for example, by means of an energy beam 4, that is, particularly a laser beam. The selective solidification of respective construction material layers to be solidified occurs on the basis of object-based construction data. Corresponding construction data describe the geometric design of the respective object 2 to be additively produced and can, for example, include "sliced" CAD data of the object 2 to be produced. The device 1 can be designed as a Laser-CUSING® device, for example, that is, as a device for carrying out selective laser melting processes (SLM process).

The device 1 comprises the functional components required to carry out additive construction processes; a coating device 5 and an exposure device 6 are shown in FIG. 1, for example. The coating device 5 is designed to form selectively exposed or selectively solidified construction material layers in a construction plane or construction field of the device 1, and comprises for this purpose a coating element (not described in more detail), which is particularly blade-like or blade-shaped, and is movably borne relative to the construction plane of the device 1. The exposure device 6 is designed for the selective exposure of construction material layers to be selectively solidified in the construction plane of the device 1 and comprises for this purpose a beam generation device (not shown), which is designed to generate the energy beam 4, a beam deflection device as applicable (not shown), which is designed to deflect the energy beam 4 generated by the beam generation device to a region to be exposed of a construction material layer to be selectively solidified, and various optical elements, such as filter elements, lens assembly elements, lens elements, etc.

FIG. 1 furthermore shows a dosing module 7, a construction module 8 and an overflow module 9, which are docked to a lower region of a process chamber 10 of the device 1 that can be inertized. Said modules can also form a lower region of the process chamber 10 of the device 1.

The device 1 furthermore comprises a flow device 11. The flow 11 is designed to form a first fluid flow FS1, which flows along at least one functional component of the device 1, particularly in a circuit-like manner, and which can be laden or is laden with contaminants, particularly particulate contaminants, which are process-created. The first fluid flow FS1 serves to remove contaminants, particularly particulate contaminants—typically so-called fume or smoke particulates—which are process-created, from the process chamber 10 of the device 1. The first fluid flow FS1 is laden with process-created contaminants along the flow path thereof and contains, particularly after exiting the process chamber 10, corresponding process-created contaminants.

In order to form the first fluid flow FS1, the flow device 11 comprises a flow generation device 17; that is, a blowing or suction device, for example. The flow generation device 17 is designed to form a fluid flow having certain flow properties; that is, a certain flow speed and a certain flow profile, for example.

The flow of the first fluid flow FS1 within the process chamber 10 is illustrated by the continuous arrows. A flowing of the first fluid flow FS1 along a functional component of the device 1 is understood to mean that the first fluid flow FS1 flows at least in sections along an outside and/or inside surface of a respective functional component.

In the embodiment shown in FIG. 1, the first fluid flow FS1 flows, proceeding from the flow device 11, first through tubular flow control elements 12 to an inflow region 13 on the process chamber side, via which the first fluid flow FS1 flows into the process chamber 10. The first fluid flow FS1 then flows within the process chamber 10 along each of the process chamber walls 10a, 10b and 10c delimiting the process chamber, wherein the process chamber wall 10a forms a ceiling of the process chamber 10, the process chamber wall 10b forms a side wall of the process chamber 10 and the process chamber wall 10c forms a floor of the process chamber 10, to an outflow region 14 on the process chamber side, via which the first fluid flow FS1 flows out of the process chamber 10. The first fluid flow FS1 then flows through an additional tubular flow control element 15 via a filter device 16, which is designed to filter corresponding contaminants out of the first fluid flow FS1, back to the flow device 11. Each of the flow control elements 12 and 15 form a component of a flow control structure defining a flow path of the first fluid flow FS1.

As shown in the following, the embodiment shown in FIG. 1, with corresponding functional components, particularly comprises respective flow control elements 12 and 15, process chamber walls 10a, 10b and 10c and a safety glass 18 forming a component of a safety glass device (not shown), via which an entry of the energy beam 4 into the process chamber 10 occurs.

In order to confront the problem, according to which deposits can form on the functional components due to the first fluid flow FS1 laden with corresponding contaminants flowing along said components, which can negatively influence the functionality thereof, the flow device 11 is additionally designed to form an inert second fluid flow FS2, shown by the dashed arrows; that is, typically a second inert gas flow. The flow device 11 is designed to form the second fluid flow FS2 so that it flows between the first fluid flow FS1 and the respective component, directly along the surface of the respective functional component. The second fluid flow FS2 can be designated or considered as a "protection flow" or "shielding flow," since it protects the respective functional component from deposits of contaminants contained in the first fluid flow FS1 or shields the respective functional component from deposits of contaminants contained in the first fluid flow FS1. The second fluid flow FS2 can thus also be considered to be a "carpet" or "curtain" associated with a respective functional component, which ensures a corresponding protection or shielding effect.

For the embodiment shown in FIG. 1, therefore, the second fluid flow FS2 flows between the first fluid flow FS1 and the flow control element walls delimiting the flow control elements 12 and 15 (see FIGS. 2 and 3), between the first fluid flow FS1 and the process chamber walls 10a, 10b and 10c delimiting the process chamber 10 and in the region of the safety glass device between the first fluid flow FS1 and the safety glass 18.

Two different fluid flows FS1 and FS2 consequently flow through the indicated flow control structure, wherein the first fluid flow FS1 (the main portion) contains corresponding contaminants and the second fluid flow FS2 contains no or fewer contaminants by comparison. Because the second fluid flow FS2 flows directly along the surfaces of respective functional components, the possibility of deposits on the respective functional component is thereby prevented or reduced.

For the embodiment shown in FIG. 2, it applies that the second fluid flow flows only in sections along certain sections of at least one of the process chamber walls 10a, 10b and 10c delimiting the process chamber 10—in the embodiment shown in FIG. 2, for example, only in sections in the region of the safety glass 18 of the process chamber wall 10a.

The flow device 11 can be part of a nozzle device (not shown) comprising a plurality of nozzle elements 19. The nozzle device is typically arranged or designed in the inflow region 13 on the process chamber side. A first nozzle element 19 or a group of first nozzle elements can be designed to form the first fluid flow FS1, and a second nozzle element 19 or a group of second nozzle elements can be designed to form the second fluid flow FS2. By arranging and aligning the respective nozzle elements or nozzle element groups, which can differ in the respective nozzle (cross-section) geometries thereof, two parallel flowing fluid flows FS1 and FS2 can be selectively generated.

Corresponding nozzle elements 19 are shown in FIG. 2. The nozzle elements 19 enable a selective local inflow or influx of the second fluid flow FS2.

For all embodiments, it applies that the first fluid flow FS1 and the second fluid flow FS2 can differ in at least one flow parameter related to the flow properties of the respective fluid flow FS1, FS2, particularly the flow speed. The possibility of mixing the first and second fluid flow FS1, FS2 can be reduced by the different flow parameters. Ideally, the first and second fluid flows FS1, FS2 flow parallel next to each other and intermix as little as possible, as shown in FIGS. 3-6.

The first fluid flow FS1 and the second fluid flow FS2 can also differ in at least one physical parameter related to the physical properties of the respective fluid flow FS1, FS2, particularly the density. The possibility of mixing the first and second fluid flow FS1, FS2 can also be reduced by the different physical parameters. As mentioned, the first and second fluid flows FS1, FS2 ideally flow parallel next to each other and intermix as little as possible.

Figure 3:
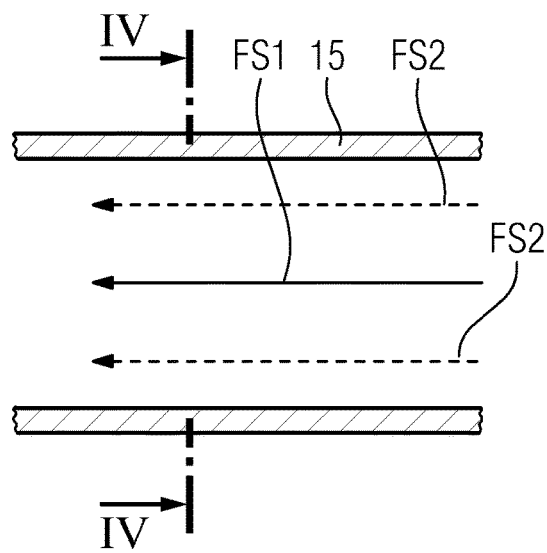
FIGS. 3-6 each provide an enlarged depiction of the detail A shown in FIG. 1.
Figure 4:
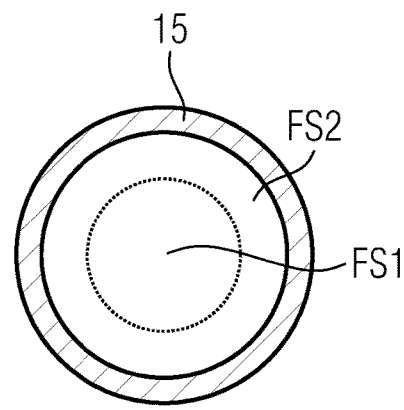

FIGS. 3 and 4 show an enlarged view of the detail A shown in FIG. 1. Detail A relates to a section of the flow control element 15, which is shown in a longitudinally sectioned view in FIG. 3 and in a transversely sectioned view in FIG. 4.

FIGS. 3 and 4 show that the first fluid flow FS1 flows centrally through the flow control element 15. The second fluid flow FS2 flows between the first fluid flow FS1 and the flow control element walls delimiting the process chamber of the flow control element 15, directly along them. The first fluid flow FS1 has a disc-shaped flow cross-section and the second fluid flow FS2 has a ring-like flow cross-section enclosing it. The flow directions of the first and second fluid flow FS1, FS2 are the same.

Figure 5:
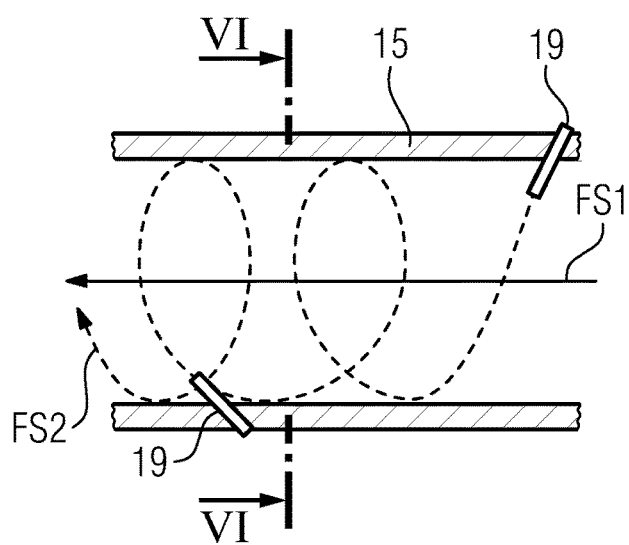
Figure 6:
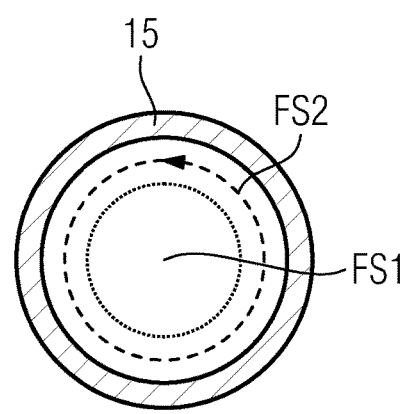

FIGS. 5 and 6 show an enlarged depiction of the detail A shown in FIG. 1. Detail A in turn relates to a section of the flow control element 15, which is shown in a longitudinally sectioned view in FIG. 5 and in a transversely sectioned view in FIG. 6.

FIGS. 5 and 6 show that the first fluid flow FS1 flows centrally through the flow control element 15. The second fluid flow FS2 flows between the first fluid flow FS1 and the flow control element walls delimiting the process chamber of the flow control element 15, directly along them. The first fluid flow FS1 has a disc-shaped flow cross-section and the second fluid flow FS2 flows around the first fluid flow FS1 in a helical or helix-shaped manner. The forming of a helical flow of the second fluid flow FS2 is possible, for example, via a suitable arrangement of corresponding nozzle elements 19, that is, one that is angularly inclined relative to the central axis of the flow control element 15. The flow directions of the first and second fluid flow FS1, FS2 are the same.

The device 1 shown in FIGS. 1 and 2 allows a method for operating a device 1 for the additive production of three-dimensional objects 2 by successive, layered, selective exposure and accompanying successive, layered, selective solidification of construction material layers of a construction material 3 that can be solidified by means of an energy beam 4 to be implemented. According to the method, a first fluid flow FS1 formed by the flow device 11 flows along at least one functional component of the device 1, wherein the first fluid flow FS1 is laden with contaminants, particularly particulate contaminants, which are process-created. The flow device 11 additionally forms a second fluid flow FS2, wherein the second fluid flow FS2 flows between the first fluid flow FS1 and the at least one functional component of the device 1, directly along the surface of the at least one functional component of the device 1.

Furthermore, a method for protecting a functional component, particularly a functional component of a device 1 as described, from contaminants, particularly particulate contaminants, adhering thereto, particularly in the region of a surface, wherein a first fluid flow FS1 flows along the functional component, particularly in a circuit-like manner, wherein the first fluid flow FS1 is laden with contaminants, particularly particulate contaminants, can be implemented. The method is characterized in that a second fluid flow FS2 is additionally formed, wherein the second fluid flow FS2 flows between the first fluid flow FS1 and the at least one functional component, directly along the surface of the at least one functional component.

The invention claimed is:

1. A device for the additive production of three-dimensional objects by successive, layered, selective exposure and accompanying successive, layered, selective solidification of construction material layers of a construction material that can be solidified by an energy beam, comprising:
   a flow device configured to form:
      a first fluid flow which flows along at least one functional component of the device at least in sections and which can be laden or is laden with particulate contaminants, which are process-created, and
      a second fluid flow, wherein the second fluid flow flows between the first fluid flow and the at least one functional component of the device, at least in sections, directly along the surface of the at least one functional component of the device,
   wherein the first fluid flow is configured to carry particulate contaminates out of a process chamber, and the second fluid flow is configured for flowing along at least one of the one or more functional component surfaces and thereby separating the first fluid flow from the at least one of the one or more functional surfaces;
   wherein the flow device further comprises a nozzle device associated with the flow device and comprising a plurality of nozzle elements, wherein at least one first nozzle element or at least one group of first nozzle elements is designed to form the first fluid flow, and at least one second nozzle element or at least one group of second nozzle elements is designed to form the second fluid flow; and
   wherein at least one of the first fluid flow or the second fluid flow flows in a circuit-like manner from an inflow region disposed on a first wall of the process chamber to an outflow region disposed on the first wall of the process chamber.

2. The device according to claim 1, wherein the first fluid flow and the second fluid flow flow along an outside surface of the at least one functional component of the device and/or along an inside surface of the at least one functional component of the device or an additional functional component of the device.

3. The device according to claim 2, wherein the functional component has, at least in sections, a flat geometric design or, at least in sections, a cylindrical or cylinder-shaped geometric design or, at least in sections, a hollow cylindrical or hollow cylinder-shaped geometric design.

4. The device according to claim 1, wherein the at least one or at least one functional component of the device is a tube-like or tube-shaped flow control element comprising an interior flow chamber, wherein the fluid flow can flow through the interior flow chamber.

5. The device according to claim 1, wherein the at least one or at least one functional component of the device is an optical element of an optical device comprising a flow surface, wherein the fluid flow can flow over the flow surface.

6. The device according to claim 1, wherein the at least one or at least one functional component of the device is a process chamber wall delimiting a process chamber of the device.

7. The device according to claim 1, wherein the first fluid flow and the second fluid flow differ in at least flow speed of the respective fluid flow.

8. The device according to claim 1, wherein the first fluid flow and the second fluid flow differ in at least density of the respective fluid flow.

9. The device according to claim 1, wherein the flow device is designed to form a helical or spiral-like second fluid flow flowing directly along the surface of the at least one functional component of the device.

10. The device according to claim 1, wherein first and second nozzle elements or first and second nozzle element groups are each arranged or designed on the same or different sections of the flow circuit formed by the fluid flow that flows in a circuit-like manner.

11. The device according to claim 1, wherein the first and the second fluid flow are inert.

12. The device according to claim 1, wherein at least one functional component of the device is a process chamber wall of the process chamber, and wherein the first fluid flow and the second fluid flow enter the process chamber at the same inflow region and exit the process chamber at the same outflow region.

13. A device for the additive production of three-dimensional objects by successive, layered, selective exposure and accompanying successive, layered, selective solidification of construction material layers of a construction material that can be solidified with an energy beam, comprising a flow device, which is designed to form a first fluid flow, which flows along at least one functional component of the device at least in sections and which can be laden or is laden with contaminants, particularly particulate contaminants, which are process-created, wherein the flow device is designed to form a second fluid flow, wherein the second fluid flow flows between the first fluid flow and the at least one functional component of the device, at least in sections, directly along the surface of the at least one functional component of the device;

wherein at least one functional component of the device is a process chamber wall of a process chamber, and wherein the first fluid flow and the second fluid flow enter the process chamber at the same inflow region and exit the process chamber at the same outflow region, wherein each of the same inflow region and the same outflow region are disposed at least in part on a common wall of the process chamber.

* * * * *